United States Patent [19]

Blount

[11] Patent Number: 4,954,327

[45] Date of Patent: Sep. 4, 1990

[54] PRODUCTION OF SILICA AEROGELS

[76] Inventor: David H. Blount, 6728 Del Cerro Blvd., San Diego, Calif. 92120

[21] Appl. No.: 231,353

[22] Filed: Aug. 12, 1988

[51] Int. Cl.$^5$ ................... C01B 33/12; B01J 13/00; C03C 3/00
[52] U.S. Cl. ................... 423/338; 106/18.12; 252/315.6; 501/12
[58] Field of Search ............ 423/338; 252/315.6; 501/12; 106/18.12

[56] References Cited

U.S. PATENT DOCUMENTS

| | | | |
|---|---|---|---|
| 4,256,682 | 3/1981 | Denton | 423/338 |
| 4,442,175 | 4/1984 | Flannery et al. | 501/12 |
| 4,767,429 | 8/1988 | Fleming et al. | 65/3.11 |

OTHER PUBLICATIONS

Hackh's Chemical Dictionary, Fourth Edition, Grant, ed., 1986, pp. 428 and 659.

Primary Examiner—John Doll
Assistant Examiner—Lori F. Cuomo

[57] ABSTRACT

Silica aerogels which exhibit very little shrinkage or partial growth during processing and drying are produced by foaming and reacting a mixture of an oxidated silicon compound, a salt forming compound and a gas in an aqueous medium. The foamed silica gel is then dried to remove water thereby producing silica aerogel.

The silica aerogels may be used as a thermal and sound insulator, filler, catalyst, catalyst carrier, reinforcing agent, binder, absorbent, thickening agent and may have other uses.

6 Claims, No Drawings

PRODUCTION OF SILICA AEROGELS

BACKGROUND OF THE INVENTION

This invention relates to a novel process for the production of silica aerogels by mixing and reacting a foamed mixture of an oxidated silicon compound such as sodium silicate in the form of a powder, suspension or solution in water and a salt forming compound. Gas is utilized to foam the mixture and to produce a foamed silica gel in which some of the liquid has been replaced by a gas thereby greatly reducing the shrinkage which would occur if the gel had been dried directly from a liquid. The gas greatly reduces loss of pore volume on drying thereby producing a silica aerogel with very low density which is one of the lightest coherent solids that can be made. An aerogel is a gel in which the liquid phase has been replaced by a gaseous phase in such a way as to avoid shrinkage.

Silica aerogels have been produced by many processes which are more expensive than the process of this invention. The known processes utilize an organic liquid having a lower surface tension, such as alcohols, cresol, urea, etc., to replace most of the water in the pores of the gel then heating the silica gel in an autoclave above the critical temperature of alcohol so that there was no meniscus between the liquid and gas phases, an venting the vapors. In this way, a liquid phase was removed without subjecting the gel structure to the compressive forces owing to the surface tension of the liquid-gas interface. Silica gels and silica aerogels are extensively discussed and references are given in "THE CHEMISTRY OF SILICA", by Ralph K. Iler, a Wiley-Interscience Publication, JOHN WILEY and SONS, NEW YORK. In the process of this invention a gas is utilized instead of an organic liquid to replace the water thereby reducing the compressive forces and in the process reducing the shrinkage of the pores in the silica gel. The use of a gas such as air greatly reduces the cost by eliminating the expense of the organic liquid and the need to autoclave the silica gel to remove the organic liquid and water. The process of this invention produces a silica aerogel with the structure closely resembling the structure of the wet silica gel originally formed. The density of this silica aerogel is directly proportional to the concentration of silica in the wet silica gel. Silica aerogel containing as little silica as 0.02 g cm$^{-3}$, one inch layer of silica aerogel may give up to an insulation value of R-20 between window panes especially when under a pressure of about 0.1 atmosphere or thermal conductance of 0.2 at atmospheric pressure.

DESCRIPTION OF THE INVENTION

Silica aerogels which exhibit very little shrinkage on drying may be produced by foaming and reacting an aqueous mixture of the following component:
(a) oxidated silicon compound
(b) salt forming compound
(c) gas

Component (a)

Any suitable oxidated silicon compound may be used in this invention such as alkali metal silicate, alkaline earth metal silicate, silicate minerals, silica, metal silicates, etc., and mixtures thereof.

Suitable alkali metal silicate include sodium, potassium, lithium, cesium and rubidium silicates. Suitable alkaline earth metal silicates include calcium, strontium, magnesium and barium silicates. Suitable metal silicates include, but are not limited to, aluminum, iron, zinc, tin and lead silicates and mixtures thereof. Various silicate minerals, especially those silicates that contain silicate radicals of low molecular weight or have continuous silicon-oxygen framework incorporating a sufficient number of iron or aluminum atoms may be used. If the structure of alumino-silicates contain more than two aluminum atoms for every three silicon atoms they may be used in this process. Any silicate mineral that will react with salt forming compounds, e.g. mineral acids, and form a silica gel may be used in this process. Certain orthosilicate minerals are easily attacked by acid and may be used to produce silica gels.

Suitable silicate minerals include, but are not limited to, clay, talc, wollastonite, aluminosilicate, mica, asbestos, willemite, zircon, forsterite, pyrope, andalusite, chrysocolla, orthoclase, natrolite, albite, etc., and mixtures thereof.

Colloidal silica stabilized under slightly alkaline conditions, which are commercially available as sols of various particle sizes, may be utilized in this process. Silicic acid sols made from alkali metal silicates or other silicates may also be used in this process.

Aqueous sodium silicate is the preferred oxidated silicon compound to be used in this process for the production of silica aerogels.

Component (b)

Any suitable salt forming compound or mixture thereof may be used in this invention. It is necessary for the salt forming compound to have the ability to react with the oxidated silicon compound or the alkaline stabilizing compound of sol. Suitable salt forming compounds included but not limited to inorganic acids, hydrogen containing salts of mineral acids, organic acids, metal salts, alkali metal salts, alkaline earth metal salts, organic compounds containing active halogen, nitrate, sulfate or phosphate compounds, halogenated phosphate compounds, sulfur dioxide, and mixtures thereof. Further examples of suitable acids may be found in German Patent No. 1,178,583 and U.S. Pat. No. 3,480,592.

Suitable inorganic acids include, but are not limited to, hydrochloric acid, sulfuric acid, phosphoric acid and nitric acid. Suitable organic acids include, but are not limited to aliphatic carboxylic acids, aliphatic acid anhydrides, aliphatic poly carboxylic acids, cycloaliphatic acids, cycloaliphatic polycarboxylic acids, aromatic carboxylic acids, aromatic polycarboxylic acids and mixtures thereof. The mineral acids are the preferred salt forming compound especially sulfuric and hydrochloric acids. Carbon dioxide in water to form formic acid is the preferred organic acid.

Component (c)

Any suitable gas may be used to foam the oxidated silicon compound in an aqueous medium or the salt forming compound in an aqueous medium. The suitable gas may be an inorganic or organic gas. Suitable inorganic gases include, but are not limited to, air, oxygen, hydrogen, nitrogen and ammonia. Suitable organic gases include, but are not limited to, carbon dioxide, halogenated organic gases, saturated and unsaturated organic gases and mixtures thereof. Compounds which will react with the acid forming compounds or oxidated silicon compounds to produce a gas may be used as the foaming or blowing agent. Air is the preferred gas. The gas may be under pressure and blown through the component to produce foam or may be mechanically mixed with the components to produce foam.

Surface-active additives such as emulsifiers and foam stabilizers may also be used according to the invention. Any suitable surface-active additive may be utilized that will assist in foaming and stabilizing the foamed components. The surface-active additives may be added to the oxidated silicon compound in water or to the salt forming compound in water. Inorganic or organic surface-active agents may be an anionic, cationic, nonionic or amphoteric surfactant. Some of the common surface-active agents include, but are not limited to, alkali metal soaps, metal soaps, a quaternary ammonium compounds, detergents, alkali metal phosphates, amino compounds, amine oxides, amidoamines, imidazolines, amine salts, lecithins, proteins, chlesterol, silicone surfactants, silicone foam stabilizers, epoxy surfactants etc., and mixtures thereof.

The silica aerogel produced by the process of this invention has many uses. It may be used as a filler in plastics, cements, etc., as a thickener in paints, varnishes, food, etc., for sound and thermal insulation, as a re-enforcing agent in plastic, rubber, etc., to produce liquid organic-silicate emulsions, to react with organic or silicon halide compounds to produce new compounds, as a thixotropic agent, as a catalyst, as a catalyst carrier, as an anti-sag agent, as a flame-retardant agent, as absorbent material, to harden organic solids, surfactant, hydrophobing effects, source of reactive silica, and other uses.

The silica aerogel may be molded in the form of an insulation sheet by the use of binder and re-enforcing agent and a front and back covering which may be used for thermal and sound insulation. Silica aerogel may be poured between glass panes, paper sheets, aluminum sheets or plastic sheets and used for insulation.

DETAILED DESCRIPTION OF THE INVENTION

The chemical reaction of this invention may take place in any suitable physical condition. Ambient pressure and temperature is usually satisfactory, but in certain conditions, an elevated or below-ambient pressure or temperature may be useful. The reactants may be added separately or simultaneously. The foaming gas may be added with components (a) or (b) or with both or added to the mixture of (a) and (b) before a gel is formed. The gas may be under ambient pressure but preferably be compressed. The foamed wet silica gel may be aged for 1 to 4 hours at an elevated temperature before drying to produce silica aerogel. The preferred process to produce silica aerogels is to add a gas to components (a) and (b) while agitating to produce foamed components then mix the foamed components in the correct ratio to produce a foamed silica gel. The foamed silica gel is then air dried at ambient or at an elevated temperature to remove the water thereby producing silica aerogels. The dried silica aerogel is a white, light weight, foamed material which has poor mechanical strength and is easily broken up into a fine powder. When a silica aerogel powder is desired the mixed foamed components are immediately spray dried as the silica gel is forming thereby producing a silica aerogel powder. Surface-active agents may be added to the components to increase the foam volume and stabilize the foam.

In an alternate method component (a) or (b) is added to a reactor then a compressed gas and the other component (a) or (b) is added while agitating until the mixture gels. The silica gel then is air dried to produce silica aerogels. The dried silica aerogels may be washed with water then filtered to remove salt then re-air dried if desired.

In another alternate method the components are simultaneously added to the mixing chamber of a foaming machine then poured into a container or sprayed into a stream of hot air or on a hot surface or into an immiscible liquid. The wet silica gel is then dried with hot air to form silica aerogels. The silica aerogel may be further treated by heating to high temperature in air or a vacuum, heated with superheated stream, given a organosilicon coating and to undergo many other treatments as desired for specific uses.

The components may be mixed and reacted in any suitable proportions as long as a silica gel is produced. The silica gel should have a pH of 2 to 9 when the reaction is complete. The proportions of the reactants and other compounds used in this invention may vary within the following ratio:

(a) 50 to 100 parts by weight of oxidated silicon compound;
(b) 1 to 50 parts by weight of a salt forming compound;
(c) 1 to 10 parts by weight of a gas
(d) the amount of water may be varied to produce the desired concentration of the oxidated silicon compounds and the salt forming compounds, 50 to 1000 parts by weight of water may be used,
(f) up to 20% by weight of a surface-active agent, percentage based on weight of components (a) and (b);
(g) up to 200% by weight of a re-enforcing agent; percentage based on the weight of components (a) and (b)
(h) up to 50% by weight of a binder, percentage based on weight of components (a) and (b)
(i) up to 500% by weight of an organic liquid based on the weight of the silica aerogel
(j) up to 500% by weight of a water-binding agent and up to 500% by weight of water with the water-binding agent, percentage based on weight of silica aerogel Re-enforcing agents may be utilized to strengthen objects made of silica aerogel such as insulation boards. Any organic or inorganic material that would act as a suitable re-enforcing agent may be used. Useful re-enforcing agents include, but are not limited to, glass fibers, calcium sulfate fibers, carbon fibers, cotton fiber, cloth polyester fibers, polypropylene fibers, wire mesh, straw, plant fibers, polyacrylonitrile fibers, woven wire mat, polyester fiber mat, polysilicic acid, wood fibers, metal fiber, asbestos, etc. and mixtures thereof.

Any suitable binding agent may be used in this invention to bind and strengthen the silica aerogel of this invention to make useful material such as insulation board. Suitable binding agents include, but are not limited to, polysilicic acid, starch, water soluble cellulose, aqueous emulsions of polyvinyl polymers, polydrene polymers, polyvinyl-diene copolymers, polyvinyl-ethylene copolymers, polyester resins, polyamide resins, polyamine-epichlorohydrin resins, urea-formaldehyde, phenol-formaldehyde and melamine-formaldehyde resin, sodium alginate, casein, furfuryl alcohol, furfural, crotonaldehyde, plant gums, etc. and mixtures thereof.

Any suitable water-binding agent such as hydraulic cement, gypsum, burnt lime or synthetic anhydrite may be utilized with silica aerogel to produce solidified water-binding materials such as concrete, plaster, etc. There are many kinds of cement which can be used to produce solidified water-binding materials and that are so well known that a detailed description of the cements will not be given here; however, one can find such a detailed description in Encyclopedia of Chemical Technology; Volume 4, pages 684 to 710, of the type of cement which may be used in the production of solidified water-binding materials of this invention and which are incorporated herein by reference. The silica aerogel greatly increases the compression strength of concrete. The silica aerogel powder is much less expensive than the fumed silica which is used in concrete.

The object of the present invention is to provide a novel process for the production of silica aerogel. Another object of the present invention is to provide a novel and lesser expensive process for the production of silica aerogel. Another object is to produce inexpensive silica aerogels which has many uses such as a filler, thixotropic agent, absorbent, surfactant, hydrophobing effect, thermal and sound insulation, catalyst, catalyst carrier and many other uses.

The silica aerogel of this invention will produce stable organic-silicate emulsion by mixing the silica aerogel with a liquid organic compound such as liquid aliphatic, cycloaliphatic, aromatic and heterocyclic compounds. These organic-silicate emulsions are useful in the producing of organic-silicate compounds, polymers and resins such as polyester silicate resins, epoxy silicate resins, polyvinyl silicate resins, polyurethane silicate resins and foams, polydiene silicate resins and others. Useful stable emulsion may be produced by mixing silica aerogel with liquid or emulsions of organic polymers such as phenoplasts, aminoplasts, polyesters, polyamides, silicones, polyethers, thioplasts, furan resins, polyvinyl resins, rubber, poly (allyl chloride) resin, poly (allyl alcohol) resin, polyepoxy resins, polyols, polydiene resins, cyclic resins and mixtures thereof. Useful stable organic silicate emulsion may be produced by mixing silica aerogel with polymerizable liquid organic compound which may be polymerized with catalysts to produce solid plastics which may be utilized to make useful objects, building material, molded materials, etc. Useful liquid organic compounds include but are not limited to vinyl compounds, diene compounds, epoxy compounds, polyisocyanates, allyl compounds, furan compounds and mixtures thereof.

A flame-retardant agent which is useful in plastics may be produced when the salt forming compound contains phosphorus and is reacted with the oxidated silicon compound to produce a mixture of foamed silica gel and a phosphorus containing salt. The mixture is then dried to produce a flame-retardant agent containing silica aerogel and a phosphorus containing salt which may be mixed with plastics, epoxy resins, polyisocyanate resins and foams to reduce the flammability of the products. Only 5 to 10% by weight of this flame-retardant agent is necessary to reduce the flammability of the products.

Compounds of the type $R_3-SiX$, $R_2SiX_2$ and $RSiX_3$, wherein R is an alkyl or aromatic group, and X is a halide, reacts with the SiOH group on the surface of silica aerogel to form a chemisorbed layer of organosilyl groups to produce a hydropholic silica surface. The compound $(CH_3)_3SiNHSi(CH_3)_3$ is particularly useful since with adsorbed water it forms only $NH_3$ and volatile $(CH_3)SiOSi(CH_3)_3$, and reacts with the SiOH group on the silica aerogel, it forms —$SiOSi(CH_3)_3$ on the surface and $NH_3$. Alkylchlorosilanes with ammonia may be used to coat the silica aerogel with an organosilicon coating. Alkoxylorganosilanes such as $(CH_3)_3SiOCH_3$ and $(CH_3)_2Si(OCH_3)_2$ may also be used to form a organosilicon coating. Commercial organosilanes such as (a) $RCH_2CH_2CH_2Si(OCH_3)_3$ where R is $NH_2CH_2CH_2NH-$, $CH_2=C(CH_3)COO-$,

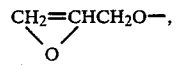

CL—, $NH_2$—, or HS—; or (b) $CH_2=CHSi(OCH_3)_3$ may be used to coat the silica aerogel particles.

DESCRIPTION OF PREFERRED EMBODIMENTS

My invention will be illustrated in greater detail by the specific Examples which follow, it being understood that these preferred embodiments are illustrative of, but not limited to, procedures which may be used in the production of silica aerogels.

Example 1

About 30 parts by weight of a 15% hydrochloric acid aqueous solution is agitated in an open container at ambient temperature and pressure to produce a foam then an aqueous solution containing 15% by weight of sodium silicate with a $SiO_2$:NaO ratio of 3.25:1 is slowly added while agitating and foaming until the mixture gels. The foamed silica gel is then air dried to produce a white, light weight silica aerogel. The aerogel weighs about 1-2 pounds per cubic foot. The aerogel is further dried at 500° C. The dried aerogel powder has thixotropic properties.

Example 2

About 50 parts by weight of an aqueous solution containing 20% sodium silicate are foamed with compressed air while agitating then dilute sulfuric acid is slowly added while foaming and agitation is continued until the mixture gels. The foamed silica gel is then air dried to produce a white, light weight silica aerogel.

Example 3

About 50 parts by weight of an aqueous solution containing 20% hydrochloric acid and 1 part by weight of silicone foam stabilizer (DOW 193) are foamed with compressed air to about 4 times its original volume then an aqueous suspension containing 15% sodium silicate and 5% calcium silicate powder is slowly added to the hydrochloric acid while agitating and foaming with compressed air until the pH is between 5 and 6. The calcium silicate gives off a gas, oxygen, and the foamed suspension slowly gels. The foamed silica gel is air dried in an oven thereby producing silica aerogel.

Example 4

About 40 parts by weight of aqueous sodium silicate containing 25% sodium silicate with a 3.25:1 $SiO_2$:NaO ratio and 1 part by weight of sodium phosphate are poured into a container and foamed by adding carbon dioxide under pressure while agitating. The foamed mixture gelled at about a pH of 8–9. The foamed silica gel is air dried with hot air thereby producing silica aerogel. Very little shrinkage takes place when the silica gel is being dried. The silica aerogel is a white, light weight material which is easily mechanically broken to a very fine powder.

Example 5

About 40 parts by weight of an aqueous solution containing 20% by weight of phosphoric acid and 0.5 parts by weight of silicone foam stabilizer (L5420 by Union Carbide) are foamed by agitating in air then about 30 parts by weight of an aqueous suspension of talc powder, 25% by weight, are mixed while agitating. Oxygen is given off by the chemical reaction and foams the mixture. The foamed mixture slowly gels. The silica gel is cured for about 24 hours then air dried thereby producing a gray colored, foamed, light weight silica aerogel.

Example 6

About 30 parts by weight of an aqueous sodium silicate suspension containing 5 parts by weight of Bentonite powder are foamed with compressed air then an aqueous solution containing 50% acetic acid which has been foamed with compressed air is slowly added while agitating until the mixture gels. The silica gel is aged for 24 hours then dried with hot air thereby producing white, light weight silica aerogel.

Example 7

Example 1 is modified wherein a surface-active agent in the amount of 1 part by weight is added to components (a) and (b) and selected from the list below.
(a) silicone foam stabilizer (L5420 by Union Carbide)
(b) silicone foam stabilizer (DOW 193 by DOW)
(c) sodium salt of ricinoleic sulphonic acid
(d) oleic acid diethylamine
(e) stearic acid diethanolamine
(f) sodium dodecylbenzene sulphonate
(g) sodium polyacrylate
(h) sodium alginate
(i) polyvinyl alcohol
(j) polyvinyl decanol
(k) sodium docyl sulfosuccinate
(l) sodium phosphate
(m) ammonium sulfonate Example 8

The process of claim 1 wherein 3 parts by weight of a binder is added to components (a) and (b) and selected from the list below.
(a) aqueous emulsion of polyvinyl acetate
(b) aqueous emulsion of poly (methyl methacrylate)
(c) aqueous emulsion of poly (vinylidene chloride)
(d) aqueous emulsion of poly (methyl acrylate)
(e) aqueous emulsion of poly (allyl methacrylate)
(f) aqueous emulsion of polystyrene
(g) aqueous emulsion of poly (vinylchloride)
(h) aqueous emulsion of polyisoprene
(i) starch
(j) methyl cellulose
(k) aqueous emulsion of polyamide
(l) aqueous emulsion of phenol-formaldehyde resin
(m) sodium alginate
(n) casein
(o) aqueous emulsion of urea-formaldehyde resin
(p) aqueous emulsion of melamine-formaldehyde resin
(q) furfural
(r) furfuryl alcohol
(s) crotonaldehyde
(t) sodium cellulose
(u) poly (vinyl acetate-ethylene copolymer) aqueous emulsion
(v) aqueous emulsion of polyester resin
(w) plant gum Example 9

The process of claim 1 wherein 3 parts by weight of a re-enforcing agent is added to the components (a) and (b) and selected from the list below.
(a) glass fibers
(b) calcium sulfate fiber
(c) carbon fibers
(d) cotton fibers
(e) polyester fiber
(f) polypropylene fiber
(g) wire netting
(h) straw
(i) plant fiber
(j) polyacrylonitrile fibers
(k) woven wire mat
(l) polyester fiber mat
(m) wire fibers Example 10

Example 1 is modified wherein another salt forming compound is utilized in place of hydrochloric acid and selected from the list below.
(a) sulfuric acid
(b) nitric acid
(c) phosphoric acid
(d) acetic acid
(e) calcium chloride
(f) sodium hydrogen sulfate
(g) calcium sulfate
(h) chloroacetic acid
(i) barium chloride
(j) ferric sulfate
(k) magnesium chloride
(l) magnesium sulfate
(m) sodium dihydrogen phosphate
(n) ammonia carbonate
(o) formic acid Example 11

Example 1 is modified wherein 10 parts by weight of a silicic acid sol containing 15% silicic acid is added with the aqueous sodium silicate solution.

Example 12

Example 1 is modified wherein 10 parts by weight of an aqueous suspension of colloidal silica stabilized under slightly alkaline condition and containing 15% by weight colloidal silica is added with the aqueous sodium silicate solution.

Example 13

About 50 parts by weight of an aqueous solution containing 10% by weight sulfuric acid and 1 part by weight of a silicone foam stabilizer (DOW 190) are foamed by adding compressed air until the volume expands about 3 times than an aqueous silicic acid sol containing 20% polysilicic acid is slowly added until the mixture gels. After about 24 hours the silica gel is dried with hot air thereby producing white, light weight aerogel.

Example 14

About 30 parts by weight of an aqueous solution containing 15% by weight of sulfuric acid and about 0.5 parts by weight silicone foam stabilizer (L6202 by Union Carbide) are foamed and mixed by compressed air simultaneously with about 30 parts by weight of an aqueous suspension containing 20% sodium silicate and 0.5 parts by weight of sodium dodecylbenzene sulfonate in a foaming machine then poured into a 1" deep mold. The mixture forms a silica gel. The silica gel is then dried in an oven at 150° C. thereby producing a white light weight silica aerogel.

Example 15

About 50 parts by weight of an aqueous solution containing 10% by weight of sulfuric acid and 1 part by weight of a foam stabilizer (LK-221 by Air Products) are foamed with compressed air then spray mixed onto a ½" deep glass dish with 40 parts by weight of an aqueous solution containing 20% by weight of sodium silicate having a $SiO_2:NaO$ ratio of 3.25:1 which had been foamed with compressed air. The glass dish is filled with the foamed components and form a silica gel. The silica gel is then air dried in an oven at 150° C. to form a white, light weight aerogel which has very little shrinkage. The aerogel is very easily mechanically broken up into a very fine powder. The ½" layer of aerogel may be incased in a solid front and back sheet of plastics, paper, glass, cloth, etc. and utilized for thermal and sound insulation. The aerogel powder may be used as a filler, as a thickener, as a reinforcing agent and in coating agents. The silica aerogel weighs from 0.5 to 3 pounds per cubic feet.

Example 16

Example 1 is modified wherein comparison studies were done comparing the shrinkage of the foamed silica gel and an unfoamed silica gel using the same components (a) and (b). The unfoamed silica gel shrunk down to about 25% of its original volume upon drying whereas the foamed silica gel shrunk very little and retained 80–90% of its original volume after drying.

Example 17

Example 15 is modified wherein the mixed components are immediately sprayed into a stream of hot air and dried thereby producing fine white silica aerogel powder. The aerogel powder may be dried to contain the desired amount of attached water usually for 0–20% by weight depending upon its end use.

Example 18

Example 1 is modified wherein the silica aerogel is wet with chloropropyltrimethoxysilane then ammonia is passed through the wetted silica aerogel thereby coating the silica aerogel particle.

Example 19

Example 1 is modified wherein the silica aerogel is wet with an alkoxylorganosilane, $(CH_3)_3SiOCH_3$ thereby forming an organosilicon coating on the silica aerogel particles.

Example 20

Example 1 is modified wherein the silica aerogel is wet with an alkoxylorganosilane, $(CH_3)_2Si(OCH_3)_2$ thereby forming an organosilicon coating on the silica aerogel particles.

Example 21

Example 1 is modified wherein the silica aerogel is wet with methyl silicon trichloride $(CH_3SiCl_3)$ thereby forming an organosilicon coating on the silica aerogel particles.

Example 22

About 20 parts by weight of Portland cement, 5 parts by weight of the silica aerogel produced by the process of example 1 and 10 parts by weight of water are mixed. The mixture sets to form a solidified water-binding material (concrete). Fillers such as sand and gravel and re-enforcing material such as steel rod may be added to the cement.

Example 23

Example 22 is modified wherein another water-binding agent is used in place of Portland cement and selected from the list below
 (a) gypsum
 (b) burnt lime
 (c) calcium-aluminate cement
 (d) quick-setting cement
 (e) brick cement
 (f) lime cement
 (g) gypsum cement
 (h) sulphate-resistant cement

Example 24

Example 1 is modified wherein hydrochloric acid is replaced with a salt-forming phosphorus containing compound, selected from the list below thereby producing a flame-retardant silica aerogel-phosphorus containing salt mixture:
 (a) phosphoric acid
 (b) phosphenic acid
 (c) phosphinous acid
 (d) phosphine oxide
 (e) monoaluminum phosphate
 (f) hypophosphorus acid
 (g) sodium dihydrogen phosphate
 (h) phosphorus trichloride
 (i) methyl chlorophosphine
 (j) potassium dihydrogen phosphate

Example 25

About 5 parts by weight of the silica aerogel produced in example 1 are mixed with 10 parts by weight of an organic compound listed below thereby producing a stable organic-silicate emulsion:
 (a) ethanol
 (b) ethylene dichloride
 (c) phenol
 (d) styrene
 (e) isoprene
 (f) acetaldehyde
 (g) acetic acid
 (h) propylene oxide
 (i) epichlorohydrin
 (j) ethylene chlorohydrin
 (k) benzene (l) tolylene diisocyanate
(m) propylene glycol
(n) acrylic acid
(o) methyl methacrylate
(p) acrylonitrile
(q) acetone
(r) nitropropane
(s) diethylenetriamine
(t) ethylenediamine
(u) furfurylalcohol Example 26

About 5 parts by weight of the silica aerogel produced in Example 1 are mixed with about 10 parts by weight of a liquid or suspended polymer listed below thereby producing a stable organic-silicate emulsion:
(a) phenol-formaldehyde resin
(b) urea-formaldehyde resin
(c) polyester
(d) polyester resin
(e) polyamide resin
(f) polyfurfural resin
(g) ketone-furfural resin
(h) rubber latex
(i) polystyrene resin
(j) acrylic acid resin
(k) polyepoxy resin
(l) poly (methyl methacrylate) resin
(m) polyisoprene resin
(n) poly (vinyl acetate) resin
(o) polypropylene glycol
(p) polypropylene oxide
(q) polyepichlorohydrin
(r) poly (allyl chloride) resin
(s) poly (furfuryl aldehyde) resin
(t) epichlorohydrin ethylene diamine polymer
(u) ethylene glycol-tolylene diisocyanate prepolymer Although specific conditions and ingredients have been described in conjunction with the above Examples of preferred embodiments, these may be varied and other reagents and additives may be used, where suitable, as described above, with similar results.

Other modifications may applications of this invention will occur to those skilled in the Art, upon reading this disclosure. These are intended to be included within the scope of this invention as defined in the appended claims.

I claim:

1. The process for the production of silica aerogels which consists of foaming, mixing and reacting the following components in water:
    (a) oxidated silicon compound selected from the group consisting of alkali metal silicates, alkaline earth metal silicates, silicate minerals, silicic acid sol, aqueous suspension of colloidal silica and mixtures thereof, in the amount of 50 to 100 parts by weight;
    (b) salt forming compound selected from the group consisting of mineral acid, organic acids and mixtures thereof, in the amount of 1 to 10 parts by weight; and
    (c) gas selected from the group consisting of air, nitrogen, hydrogen, oxygen, organic gases and mixtures thereof, in the amount of 1 to 10 parts by weight to produce a foamed silica gel, the foamed silica gel is then dried.

2. The process of claim 1 wherein up to 20 parts by weight of a surface-active agent is added to components (a) or (b) or to both, percentage based on weight of components (a) and (b).

3. The process of claim 1 wherein the salt forming compound is a mineral acid and is selected from the group consisting of sulfuric acid, hydrochloric and phosphoric acid.

4. The process of claim 1 wherein the gas is air.

5. The process of claim 1 wherein the mineral silicates are selected from the group consisting of clay, talc, wollastonite, zircon, mica, asbestos, willemite, forsterite, pyrope, andalusite, chrysocolla, orthoclase, natrolite, albite and mixtures thereof.

6. The process of claim 1 wherein the salt forming compound is a phosphoric acid containing compound, selected from the group consisting of phosphoric acid, phosphinic acid, phosphinous acid, organic acid phosphates, and mixtures thereof thereby producing a flame-retardant silica aerogel-phosphorus containing salt mixture.

* * * * *